(No Model.)
J. L. RITER.
WIRE FENCE.
No. 506,256. Patented Oct. 10, 1893.
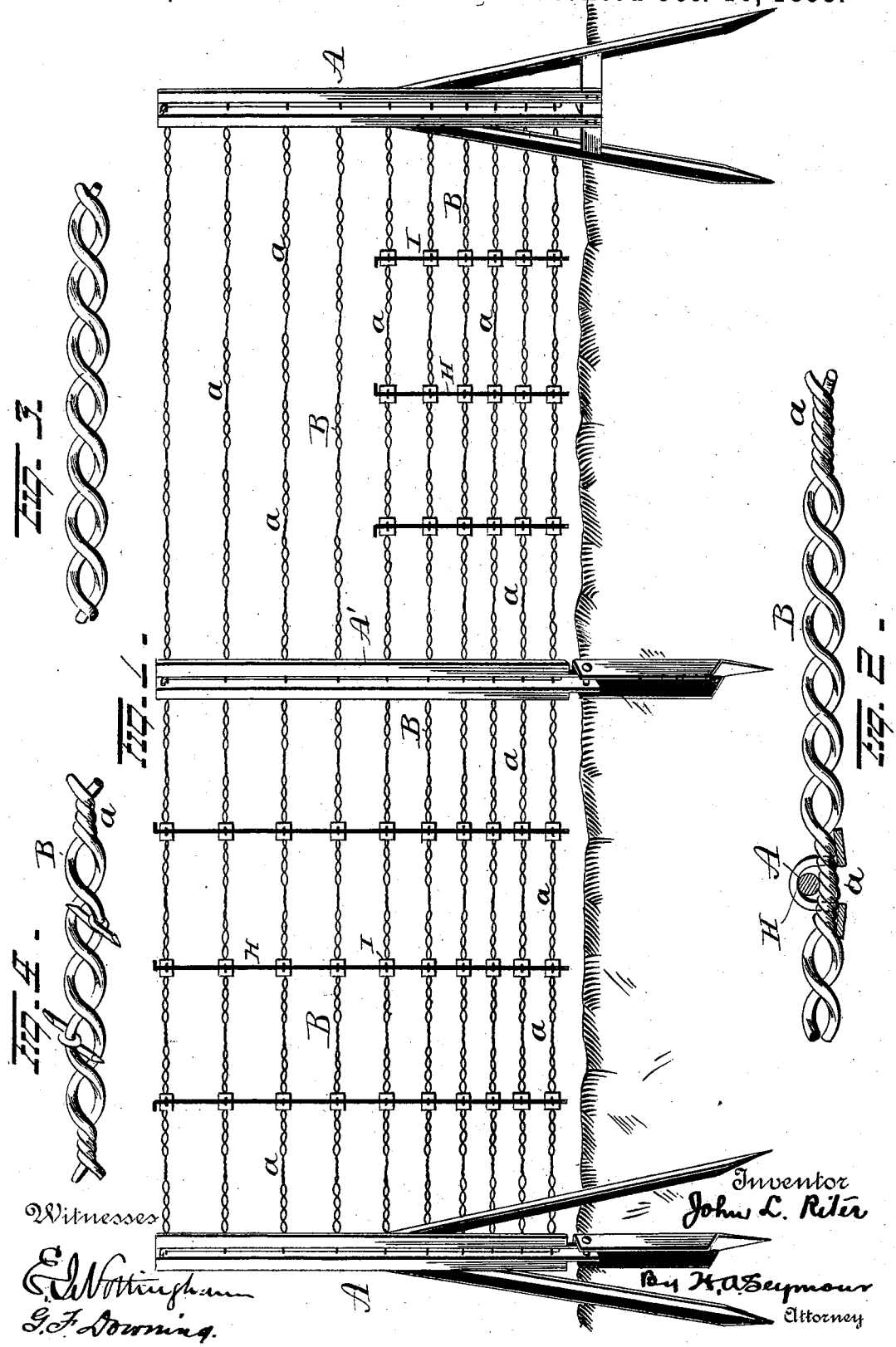
Witnesses
E. W. Nottingham
G. F. Downing
Inventor
John L. Riter
By H. A. Seymour
Attorney

UNITED STATES PATENT OFFICE.

JOHN L. RITER, OF BROWNSVILLE, INDIANA.

WIRE FENCE.

SPECIFICATION forming part of Letters Patent No. 506,256, dated October 10, 1893.

Application filed August 26, 1892. Serial No. 444,151. (No model.)

*To all whom it may concern:*

Be it known that I, JOHN L. RITER, of Brownsville, in the county of Union and State of Indiana, have invented certain new and useful Improvements in Wire Fences; and I do hereby declare the following to be a full, clear, and exact description of the invention, such as will enable others skilled in the art to which it appertains to make and use the same.

My invention relates to an improvement in wire fences and more particularly to improvements in the cables of such fences, the object being to provide a cable sufficiently elastic to yield or give under external pressure without injury, and at the same time be of a size sufficient to enable it to be readily seen by animals.

With these ends in view my invention consists in a cable made of a series of round steel wires each wire bent into spiral form and the several wires constituting the cable twisted together at intervals.

My invention further consists of an elastic cable made of a series of wires, each wire being coiled spirally as shown, the several wires constituting the series being coiled together loosely.

My invention further consists in a cable made of a series of round steel wires each wire bent into spiral form, the several wires being twisted together at intervals, and barbs secured at intervals on one or more of the wires of the series.

My invention further consists in the parts and combinations of parts as will be more fully described and pointed out in the claims.

In the accompanying drawings, Figure 1 is a view in elevation of a section of a fence. Fig. 2 is a view of a section of a cable. Fig. 3 is a similar view of a modified form of cable, and Fig. 4 is a view showing the cable provided with barbs.

A represents rigid posts and A' an intermediate pivoted post carrying the cables B. These cables can be secured to rigid posts located at suitable intervals apart and to pivoted posts intermediate the rigid posts and each cable consists of a series, (two or more) of wires each wire being bent into spiral form, and placed with relation to each other as shown, the several wires constituting the cable being twisted together at intervals as shown at a, thus forming a strong and durable cable which is sufficiently large to be readily seen by stock, and which at the same time is sufficiently elastic to readily give or yield under external pressure and expand or contract with varying temperatures. The more coils or turns to any given length renders the wire more elastic, but from two to six coils or turns to each foot of wire with the coils from one eighth to one half inch in diameter will be ample for most fences.

The cables are prevented from spreading apart by the stay rods H and locks I which latter lock the cables to the stay rods and prevent the cables from being pushed apart or separated by stock or animals.

While I prefer to twist the cable at intervals as shown in Fig. 2, I can if desired omit the twisting and employ cables like that shown in Fig. 3.

It is evident that numerous slight changes might be resorted to in the relative arrangement of parts herein shown without departing from the spirit and scope of my invention hence I would have it understood that I do not limit myself to the exact construction shown and described; but, Having fully described my invention, what I claim as new, and desire to secure by Letters Patent, is—

1. An elastic cable made of a series of wires, each wire being coiled spirally as shown, the several wires constituting the series being coiled together loosely as shown and described, substantially as set forth.

2. An elastic cable made of a series of wires each wire being coiled spirally and arranged relatively to each other as shown and twisted together at intervals, substantially as described.

In testimony whereof I have signed this specification in the presence of two subscribing witnesses.

JOHN L. RITER.

Witnesses:
O. M. BALL,
G. F. DOWNING.